(12) United States Patent
Yang

(10) Patent No.: US 7,600,722 B2
(45) Date of Patent: Oct. 13, 2009

(54) WIRE ATTACHMENT DEVICE FOR VEHICLE

(76) Inventor: Fang Lin Yang, 2F, No. 13, Sinhai Road, Chinsuei Town, Taichung Hsien 43653 (TW)

( * ) Notice: Subject to any disclaimer, the term of this patent is extended or adjusted under 35 U.S.C. 154(b) by 71 days.

(21) Appl. No.: 11/974,062

(22) Filed: Oct. 11, 2007

(65) Prior Publication Data

US 2009/0096247 A1 Apr. 16, 2009

(51) Int. Cl.
*F16L 3/08* (2006.01)
(52) U.S. Cl. .......................... 248/65; 248/74.1
(58) Field of Classification Search ............... 248/65, 248/74.1, 74.2, 68.1; 296/95.1
See application file for complete search history.

(56) References Cited

U.S. PATENT DOCUMENTS

| | | | |
|---|---|---|---|
| 4,426,111 A | | 1/1984 | Smith .................... 296/95 R |
| 4,566,660 A * | | 1/1986 | Anscher et al. ............ 248/74.2 |
| 5,311,417 A | | 5/1994 | Heh ........................... 362/397 |
| 5,910,351 A * | | 6/1999 | Davis et al. ................. 428/100 |
| 6,408,492 B1 * | | 6/2002 | Sparks et al. ................. 24/336 |
| 6,648,492 B1 | | 11/2003 | Shih ........................... 362/397 |
| 2004/0065785 A1 * | | 4/2004 | Miura et al. .................. 248/62 |
| 2006/0180716 A1 * | | 8/2006 | Tan et al. ................... 248/68.1 |
| 2008/0078891 A1 * | | 4/2008 | Hobson ..................... 248/74.2 |

\* cited by examiner

*Primary Examiner*—Ramon O Ramirez
(74) *Attorney, Agent, or Firm*—Charles E. Baxley

(57) ABSTRACT

A wire attachment device for a vehicle includes a strap having an intermediate partition, a flap extended at one side portion and spaced from the intermediate partition for forming a space between the intermediate partition and the flap and for receiving an edge portion of the vehicle, and a panel extended at the other side portion and spaced from the intermediate partition for forming a compartment between the intermediate partition and the panel, and one or more wires or cables engaged in the compartment of the strap and shielded by the strap for preventing the wires from being exposed and from spoiling the outer appearance of the vehicle and for preventing the wires from being hooked by the other objects.

4 Claims, 6 Drawing Sheets

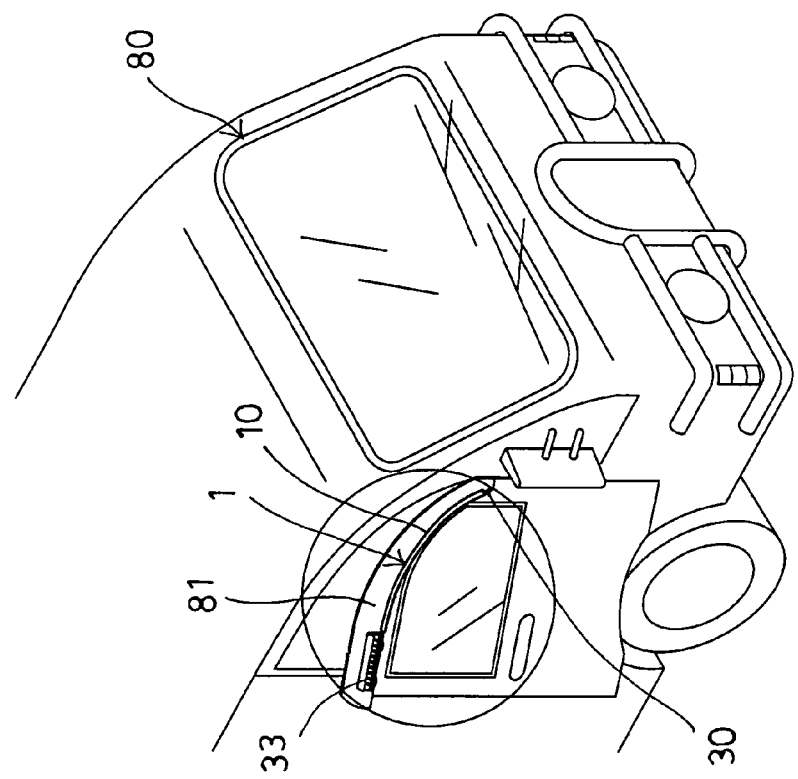
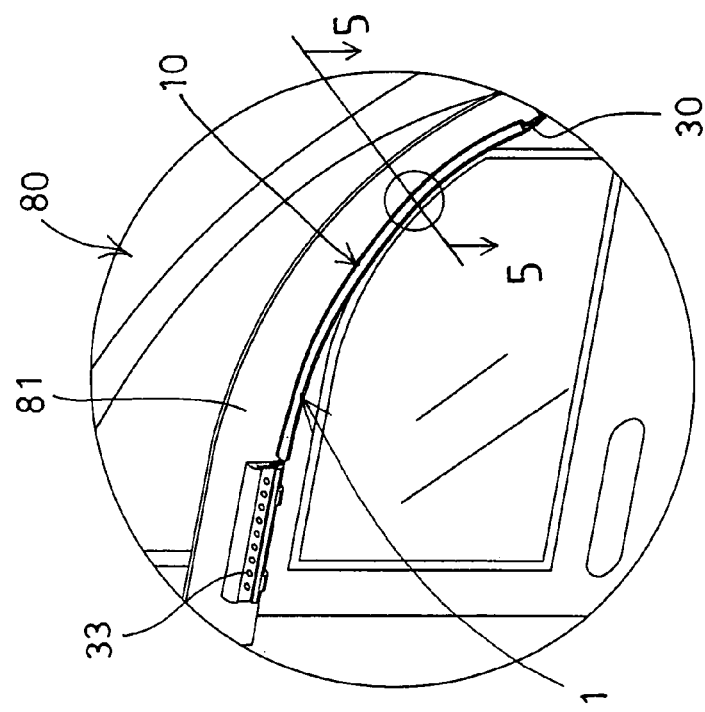

WIRE ATTACHMENT DEVICE FOR VEHICLE

BACKGROUND OF THE INVENTION

1. Field of the Invention

The present invention relates to a wire attachment device, and more particularly to a wire attachment device for attaching to various portions of a vehicle for receiving and shielding one or more wires or cables and for preventing the wires or cables from being exposed.

2. Description of the Prior Art

Typical vehicles or automobiles may comprise one or more rain shields attached to the side portions or the roof trough of the vehicles or automobiles for shielding and for preventing the entry of rain in cars.

For example, U.S. Pat. No. 4,426,111 to Smith discloses one of the typical automobile rain shields for attaching to the side portions of the vehicles or automobiles. However, when side signaling lights are attached to the typical automobile rain shields, there is no place to accommodate the electric wires or cables for the side signaling lights, and the electric wires or cables will be exposed and will spoil the outer appearance of the vehicles or automobiles.

U.S. Pat. No. 5,311,417 to Heh, and U.S. Pat. No. 6,648,492 to Shih disclose two typical illuminative devices for attaching to automobiles or vehicles and comprising electric wires or cables for coupling the light members together.

However, similarly, the electric wires or cables will also be exposed and will spoil the outer appearance of the vehicles or automobiles and will also be easily hooked by the other objects. The vehicles or automobiles have no wire attachment devices provided for receiving and shielding the wires or cables and for preventing the wires or cables from being exposed.

The present invention has arisen to mitigate and/or obviate the afore-described disadvantages of the conventional wire receiving or shielding or attachment devices.

SUMMARY OF THE INVENTION

The primary objective of the present invention is to provide a wire attachment device for attaching to various portions of a vehicle for receiving and shielding one or more wires or cables and for preventing the wires or cables from being exposed.

In accordance with one aspect of the invention, there is provided a wire attachment device for a vehicle comprising a strap including an intermediate partition, and including a flap provided at one side portion of the intermediate partition and spaced from the intermediate partition for forming a space between the intermediate partition and the flap and for receiving and engaging with an edge portion of the vehicle, and including a panel provided at the other side portion of the intermediate partition and spaced from the intermediate partition for forming a compartment between the intermediate partition and the panel, and a wire received and engaged in the compartment of the strap and shielded by the strap for preventing the wire from being exposed and for preventing the wire from spoiling the outer appearance of the vehicle and also for preventing the wire from being hooked by the other objects.

The intermediate partition preferably includes a straight and planar structure. The flap preferably includes a curved structure. The panel preferably also includes a curved structure.

The strap preferably includes an enlarged bead provided at a free end portion of the flap. The strap includes a rounded surface formed on the enlarged bead of the flap for facilitating an engagement of the edge portion of the vehicle into the space of the strap, and the strap preferably includes a curved recess formed between the enlarged bead and the flap for increasing a resilience of and the flap.

The strap preferably includes an enlarged bead provided at a free end portion of the panel. The strap includes a rounded surface formed on the enlarged bead of the panel for facilitating an engagement of the wire into the compartment of the strap. The strap includes a curved recess formed between the enlarged bead and the panel for increasing a resilience of and the panel.

A light device may further be provided and attached to the edge portion of the vehicle and coupled to the wire. The edge portion of the vehicle may either be a rain shield, a window or door, an engine housing, a trunk cover, a bumper, a rear partition or the other portions of the vehicle.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a partial perspective view of a wire attachment device in accordance with the present invention for attaching to a vehicle and for receiving and shielding one or more wires or cables;

FIG. 2 is an enlarged partial perspective view of the wire attachment device;

DETAILED DESCRIPTION OF THE PREFERRED EMBODIMENT

Figure 3:
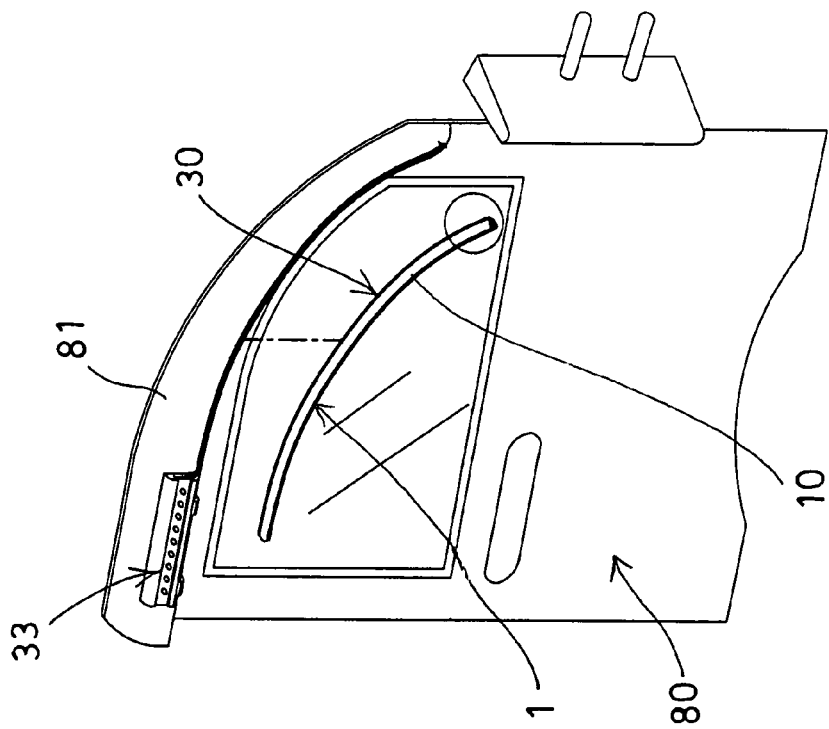
FIG. 3 is a partial exploded view of the wire attachment device.
Figure 11:
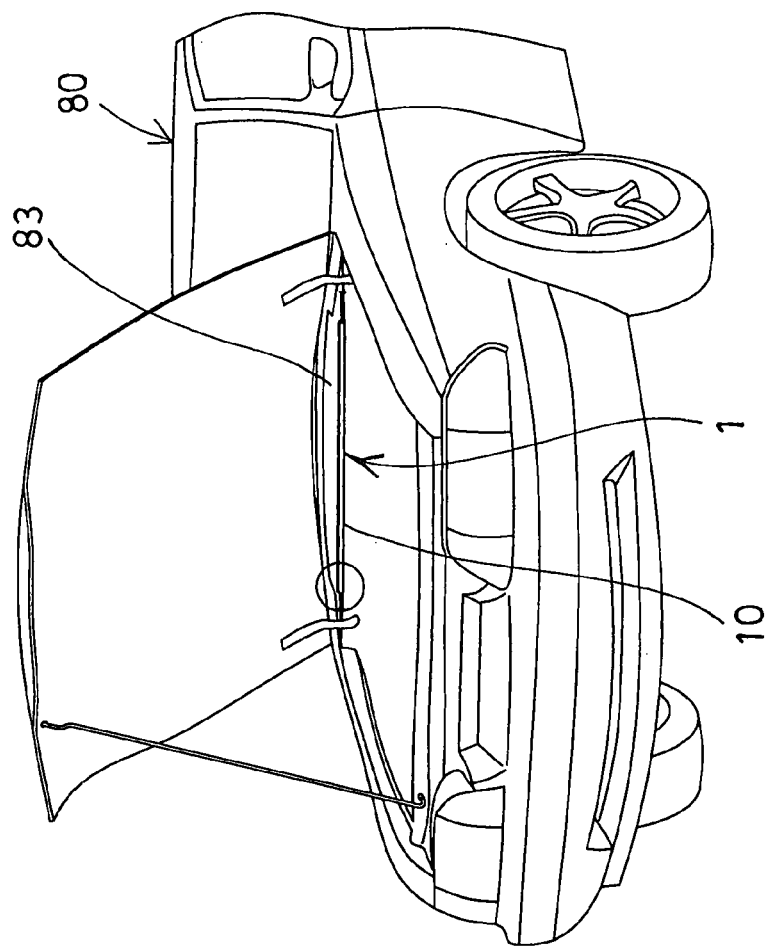
FIG. 11 is a partial perspective view similar to FIGS. 1, 7 and 9 illustrating the still further application of the wire attachment device.
Figure 12:
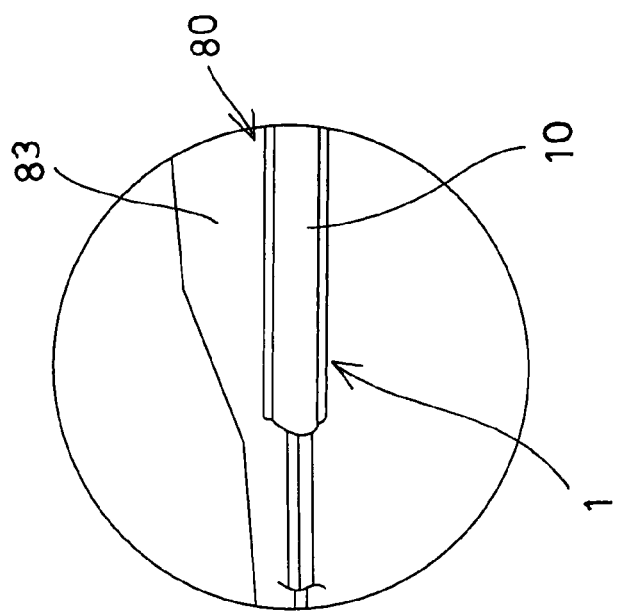
FIG. 12 is an enlarged partial perspective view of the wire attachment device as shown in FIG. 11.

Referring to the drawings, and initially to FIGS. 1-3, a wire attachment device 1 in accordance with the present invention is provided for attaching to a vehicle 80, and preferably for attaching to various flange members or edge portions 81, 82, 83 of the vehicle 80, such as the rain shields 81 (FIGS. 1-3), the windows or doors 82 (FIGS. 7-10), or the engine housing 83 (FIGS. 11-12), the trunk covers (not shown), the bumpers (not shown), the rear partitions (not shown) etc., and for receiving and shielding one or more wires or cables 30 and for preventing the wires or cables 30 from being exposed. The various flange members or edge portions 81, 82, 83 of the vehicle 80 are typical and will not be described in further details.

The wire attachment device 1 comprises one or more side signaling light devices 33 attached to the typical automobile rain shields 81 (FIGS. 1-3), or attached to the windows or doors 82 (FIGS. 7-10), or attached to the other portions of the vehicle 80, and electrically coupled to the wires or cables 30 which may electrically couple the signaling light devices 33 to the electric reservoir (not shown) of the vehicle 80 for energizing the signaling light devices 33. The wire attachment device 1 is thus provided for receiving and shielding the wires or cables 30 and for preventing the wires or cables 30 from being exposed.

Figure 4:
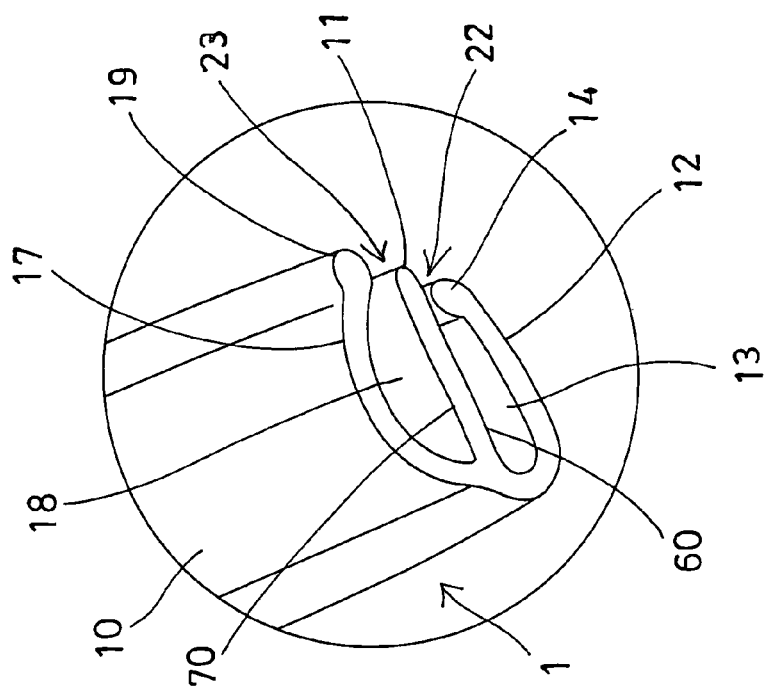
FIG. 4 is an enlarged partial perspective view of the wire attachment device.
Figure 5:
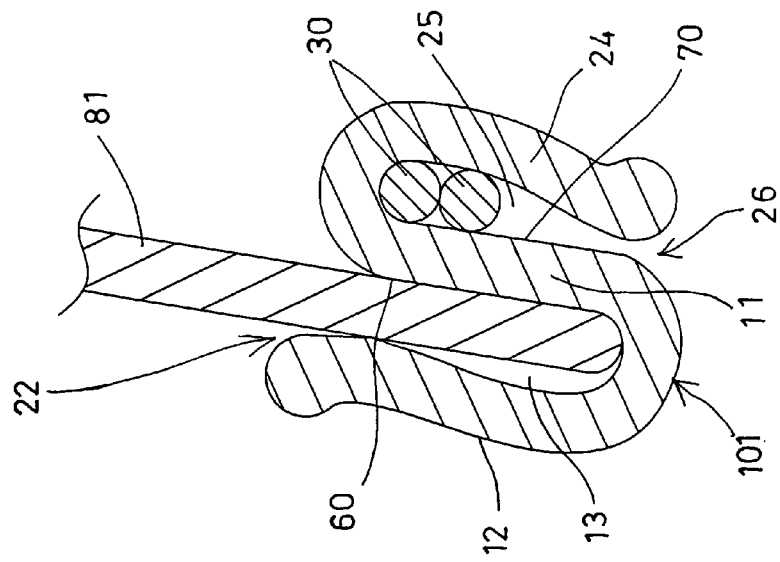
FIG. 5 is a partial cross sectional view of the wire attachment device taken along lines 5-5 of FIG. 2.

As shown in FIGS. 3-5, the wire attachment device 1 further includes a longitudinal and flexible strap 10 made of such as rubber, plastic or other synthetic materials, and formed or manufactured by such as molding or mold-injection processes, and the strap 10 includes a substantially straight or planar intermediate partition 11, a flap 12 provided or extended beside or at one side portion 60 of the intermediate partition 11 (FIGS. 4-6) and spaced from the intermediate partition 11 for forming a space 13 between the intermediate partition 11 and the flap 12 and for receiving or engaging with the rain shields 81 (FIGS. 1-3), the windows or doors 82 (FIGS. 7-10), or the engine housing 83 (FIGS. 11-12), or the other portions of the vehicle 80.

It is to be noted that the flexible strap 10 is made of such as rubber, plastic or other synthetic materials and may resiliently clamp onto the various portions 81, 82, 83 of the vehicle 80, and may further solidly secured onto the vehicle 80 with such as adhesives or weldings, latches or fasteners (not shown), or the like. It is preferable that the strap 10 includes an enlarged bead 14 provided or formed on or at the outer or free end portion of the flap 12 and having a rounded outer or inner surface 15 for allowing the various portions 81, 82, 83 of the vehicle 80 to be easily engaged into the space 13 of the strap 10, and includes a curved recess 16 formed between the enlarged bead 14 and the flap 12 for increasing the resilience of and the flap 12. The flap 12 preferably includes a curved structure for further increasing the resilience of and the flap 12.

The strap 10 further includes a panel 17 also provided or extended beside or at the other side portion 70 of the intermediate partition 11 (FIGS. 4-6), and opposite to the flap 12, and also spaced from the intermediate partition 11 for forming a compartment 18 between the intermediate partition 11 and the panel 17 and for receiving or engaging with and shielding the wires or cables 30, best shown in FIG. 5, and thus for preventing the wires or cables 30 from being exposed and for preventing the wires or cables 30 from spoiling the outer appearance of the vehicle 80. It is also preferable that the strap 10 includes an enlarged bead 19 provided or formed on or at the outer or free end portion of the panel 17.

It is further preferable that the strap 10 also includes a rounded outer or inner surface 20 for allowing the wires or cables 30 to be easily engaged into the compartment 18 of the strap 10, and includes a curved recess 21 formed between the enlarged bead 19 and the panel 17 for increasing the resilience of and the panel 17 and for sealingly engaging with the intermediate partition 11 for forming a water-tight seal. The panel 17 also preferably includes a curved structure for further increasing the resilience of and the panel 17. It is further preferable that the space 13 of the strap 10 includes an opening or open end 22, and the compartment 18 of the strap 10 also includes an opening or open end 23 opened or faced toward the same side or end or direction as the open end 22 of the space 13 of the strap 10.

Figure 6:
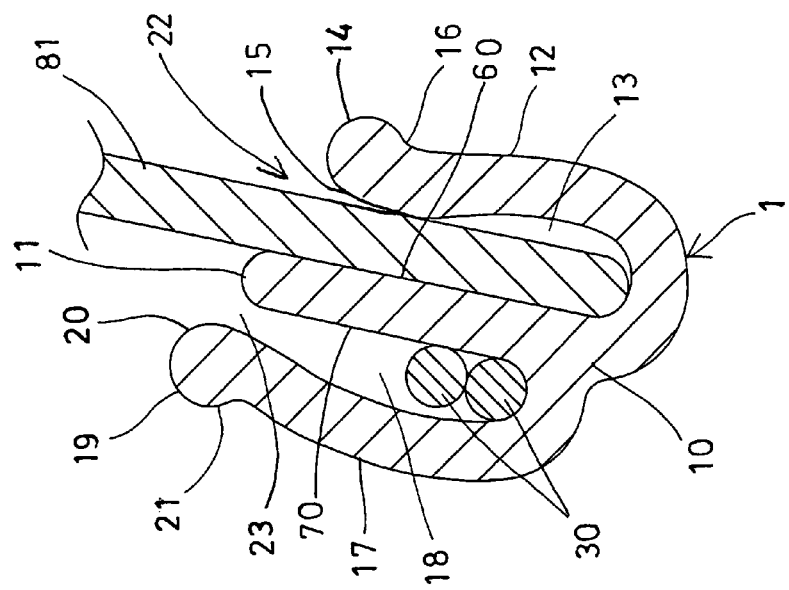
FIG. 6 is a partial cross sectional view similar to FIG. 5 illustrating the other arrangement of the wire attachment device.
Figure 7:
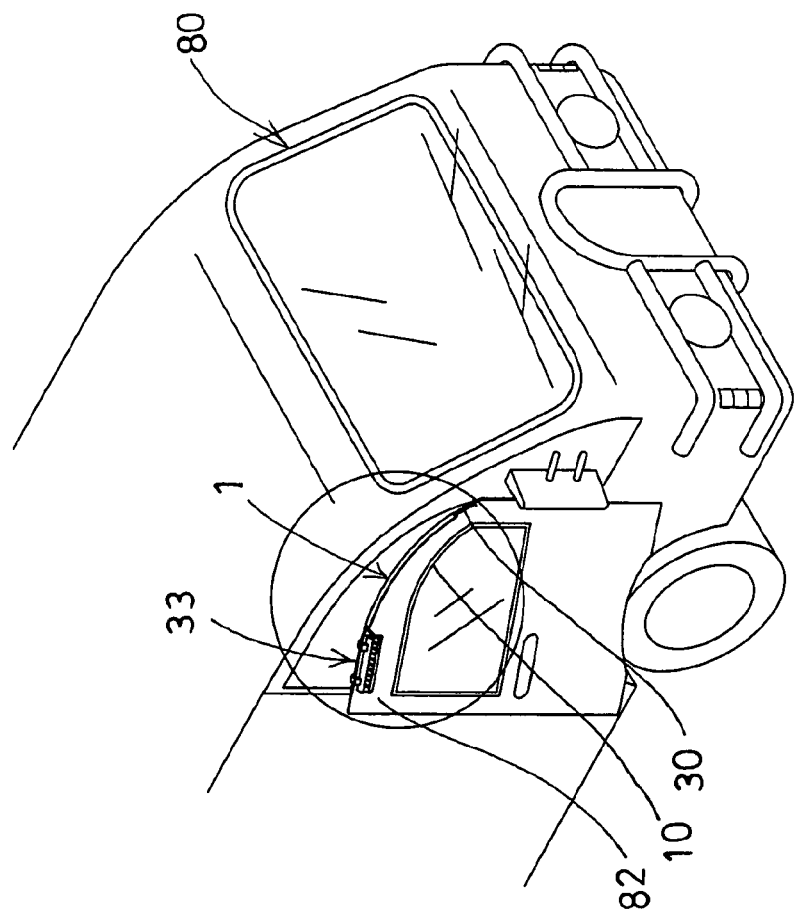
FIG. 7 is a partial perspective view similar to FIG. 1 illustrating the other application of the wire attachment device.
Figure 8:
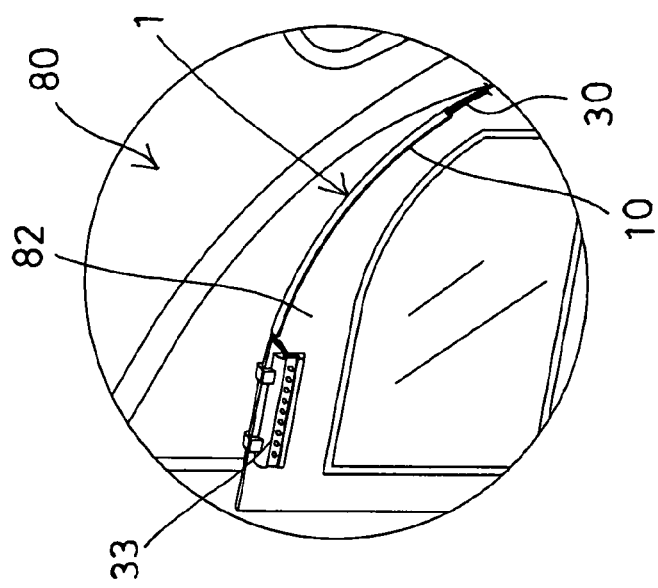
FIG. 8 is an enlarged partial perspective view of the wire attachment device as shown in FIG. 7.
Figure 9:
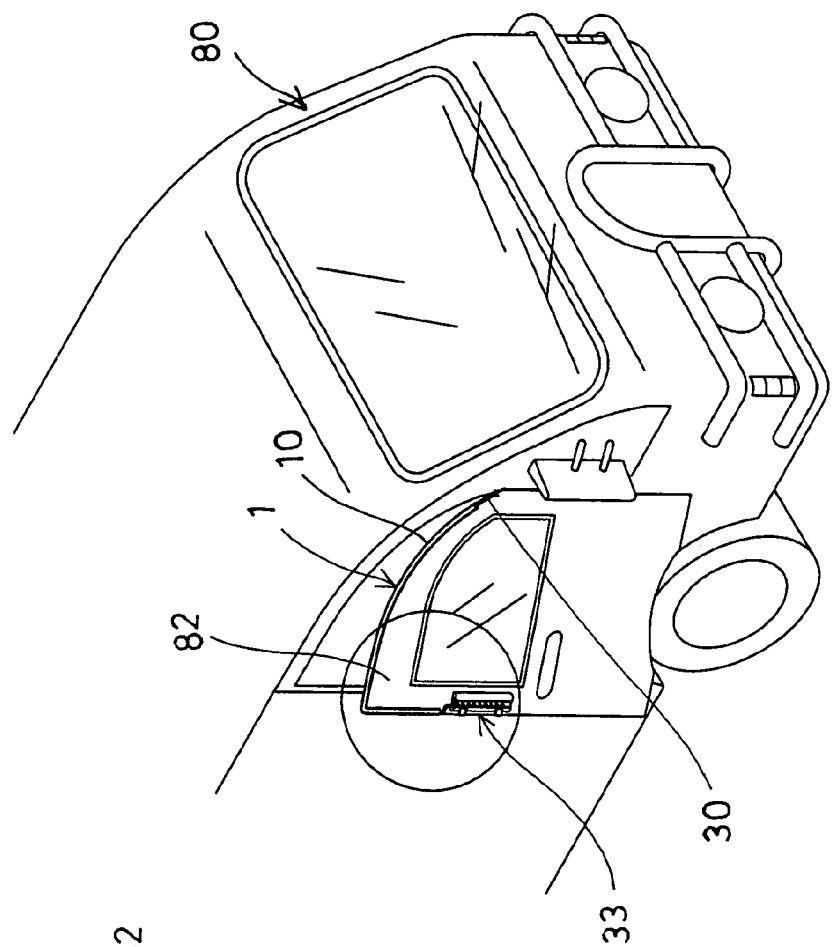
FIG. 9 is a partial perspective view similar to FIGS. 1 and 7 illustrating the further application of the wire attachment device.
Figure 10:
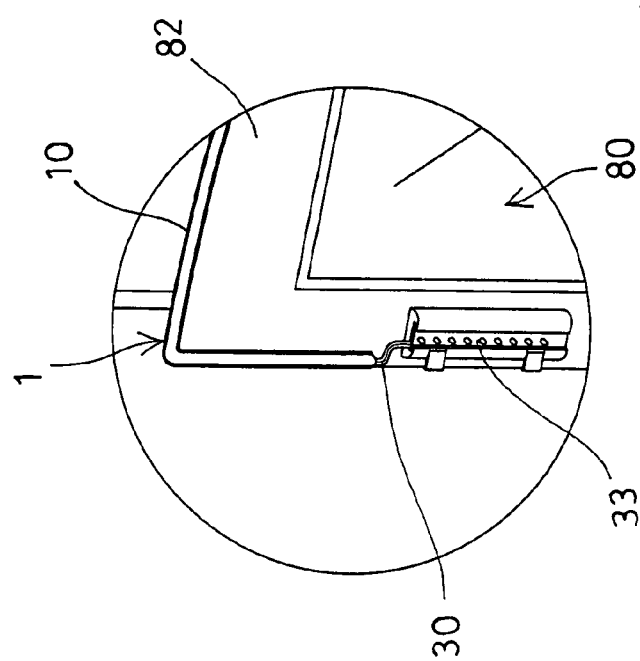
FIG. 10 is an enlarged partial perspective view of the wire attachment device as shown in FIG. 9.

Alternatively, as shown in FIG. 6, the strap 101 may also include an intermediate partition 11, a flap 12 provided or extended beside or at one side portion 60 of the intermediate partition 11 and spaced from the intermediate partition 11 for forming a space 13 between the intermediate partition 11 and the flap 12 and for receiving or engaging with the rain shields 81 (FIGS. 1-3), the windows or doors 82 (FIGS. 7-10), or the engine housing 83 (FIGS. 11-12), or the other portions of the vehicle 80. The strap 101 also includes a panel 24 provided or extended beside or at the other side portion 70 of the intermediate partition 11, and opposite to the flap 12, and also spaced from the intermediate partition 11 for forming a compartment 25 between the intermediate partition 11 and the panel 24 and for receiving or engaging with and shielding the wires or cables 30, and having an opening or open end 26 opened or faced toward the different or opposite side or end or direction as the open end 22 of the space 13 of the strap 10.

In operation, as shown in FIGS. 1-3 and 7-12, the longitudinal and flexible strap 10 of the wire attachment device 1 may be attached onto the various portions 81, 82, 83 of the vehicle 80, such as the rain shields 81 (FIGS. 1-3), the windows or doors 82 (FIGS. 7-10), or the engine housing 83 (FIGS. 11-12), by engaging the flange members or edge portions 81, 82, 83 of the vehicle 80 into the space 13 of the strap 10, and the wires or cables 30 may then be received and engaged into the compartment 18 of the strap 10 and shielded by the strap 10 for preventing the wires or cables 30 from being exposed and thus for preventing the wires or cables 30 from spoiling the outer appearance of the vehicle 80.

Accordingly, the wire attachment device in accordance with the present invention may be provided for attaching to various portions of a vehicle for receiving and shielding one or more wires or cables and for preventing the wires or cables from being exposed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wire attachment device for a vehicle comprising:
a strap including an intermediate partition having a straight and planar structure, and including a flap provided at one side portion of said intermediate partition and having a curved structure and spaced from said intermediate partition for forming a space between said intermediate partition and said flap and for receiving and engaging with an edge portion of the vehicle, and including a panel provided at the other side portion of said intermediate partition and having a curved structure and spaced from said intermediate partition for forming a compartment between said intermediate partition and said panel, and including an enlarged bead provided at a free end portion of said flap and including a rounded surface formed on said enlarged bead of said flap for facilitating an engagement of the edge portion of the vehicle into said space of said strap, and including an enlarged bead provided at a free end portion of said panel and including a rounded surface formed on said enlarged bead of said panel for facilitating an engagement of said wire into said compartment of said strap, a wire received and engaged in said compartment of said strap and shielded by said strap for preventing said wire from being exposed, and a light device for attaching to the vehicle and electrically coupled to said wire.

2. The wire attachment device as claimed in claim 1, wherein said strap includes a curved recess formed between said enlarged bead and said flap for increasing a resilience of and said flap.

3. The wire attachment device as claimed in claim 1, wherein said strap includes a curved recess formed between said enlarged bead and said panel for increasing a resilience of and said panel.

4. The wire attachment device as claimed in claim 1, wherein the edge portion of the vehicle is a rain shield.

* * * * *